United States Patent [19]

McGauran et al.

[11] 4,236,438
[45] Dec. 2, 1980

[54] SEAL FOR HEADED PIN FASTENER MEMBER

[75] Inventors: Hugh K. McGauran, Harlow; Frederick A. Summerlin, Wheathampstead, both of England

[73] Assignee: Aerpat A.G., Weidstrasse, Switzerland

[21] Appl. No.: 968,736

[22] Filed: Dec. 12, 1978

[30] Foreign Application Priority Data

Dec. 13, 1977 [GB] United Kingdom ............... 51833/77
Jan. 25, 1978 [GB] United Kingdom ................. 3010/78
May 18, 1978 [GB] United Kingdom ............... 51833/78

[51] Int. Cl.³ ............................................. F16B 43/00
[52] U.S. Cl. ....................................... 85/1 JP; 85/7; 85/50 R
[58] Field of Search ................... 85/1 JP, 7, 50 R, 62; 151/7; 277/166, 195, 198, DIG. 10

[56] References Cited

U.S. PATENT DOCUMENTS

| 1,356,404 | 10/1920 | Robinson | 85/1 JP |
| 2,643,904 | 6/1953 | Wehmanen | 85/1 JP X |
| 2,706,656 | 4/1955 | Roubal | 85/1 JP X |
| 3,066,568 | 12/1962 | Armour | 85/7 |
| 3,168,321 | 2/1965 | Glicksman | 85/1 JP X |
| 3,285,120 | 11/1966 | Kartiala | 85/62 |
| 3,510,139 | 5/1970 | Potter | 277/198 |
| 3,726,178 | 4/1973 | Dimitry | 85/1 JP |
| 3,871,668 | 3/1975 | Coker et al. | 277/195 X |
| 3,889,569 | 6/1975 | Fanciullo | 85/50 R X |
| 4,103,900 | 8/1978 | Wittersheim | 277/DIG. 10 X |

FOREIGN PATENT DOCUMENTS

| 1031383 | 5/1978 | Canada . | |
| 2717816 | 11/1977 | Fed. Rep. of Germany . | |
| 76/1289 | 3/1976 | South Africa . | |
| 444598 | 2/1968 | Switzerland | 277/166 |
| 462548 | 10/1968 | Switzerland | 277/166 |
| 830358 | 3/1960 | United Kingdom | 151/7 |
| 924162 | 4/1963 | United Kingdom | 151/7 |
| 1510282 | 5/1978 | United Kingdom . | |

*Primary Examiner*—Thomas J. Holko
*Attorney, Agent, or Firm*—Oblon, Fisher, Spivak, McClelland & Maier

[57] ABSTRACT

A resilient seal 15 for the head 14 of a headed pin fastener member comprises an annular sealing bead 25, an annular boss 24 projecting on both sides beyond the thickness of the bead 25 and having tapered faces 29, 29, and a thin annular web 26 joining the parts 24 and 25. The symmetry of the seal enables it to be assembled on the pin either way round, with the same result.

2 Claims, 7 Drawing Figures

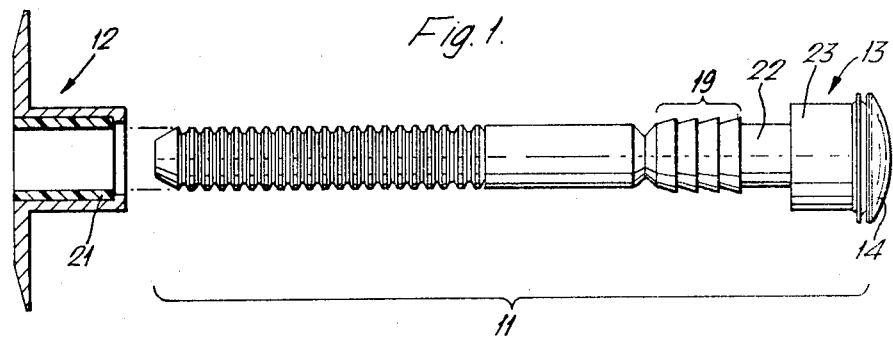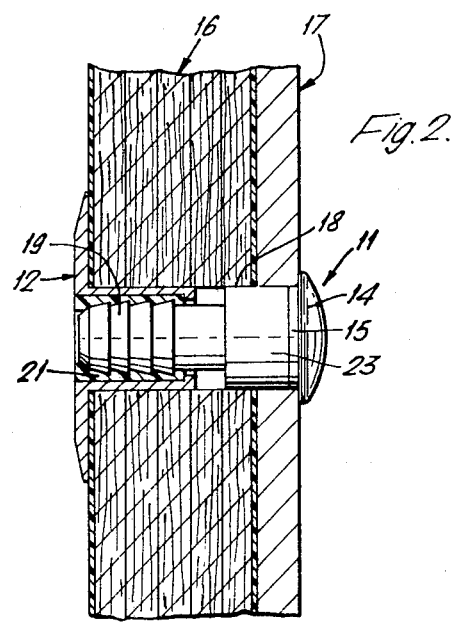

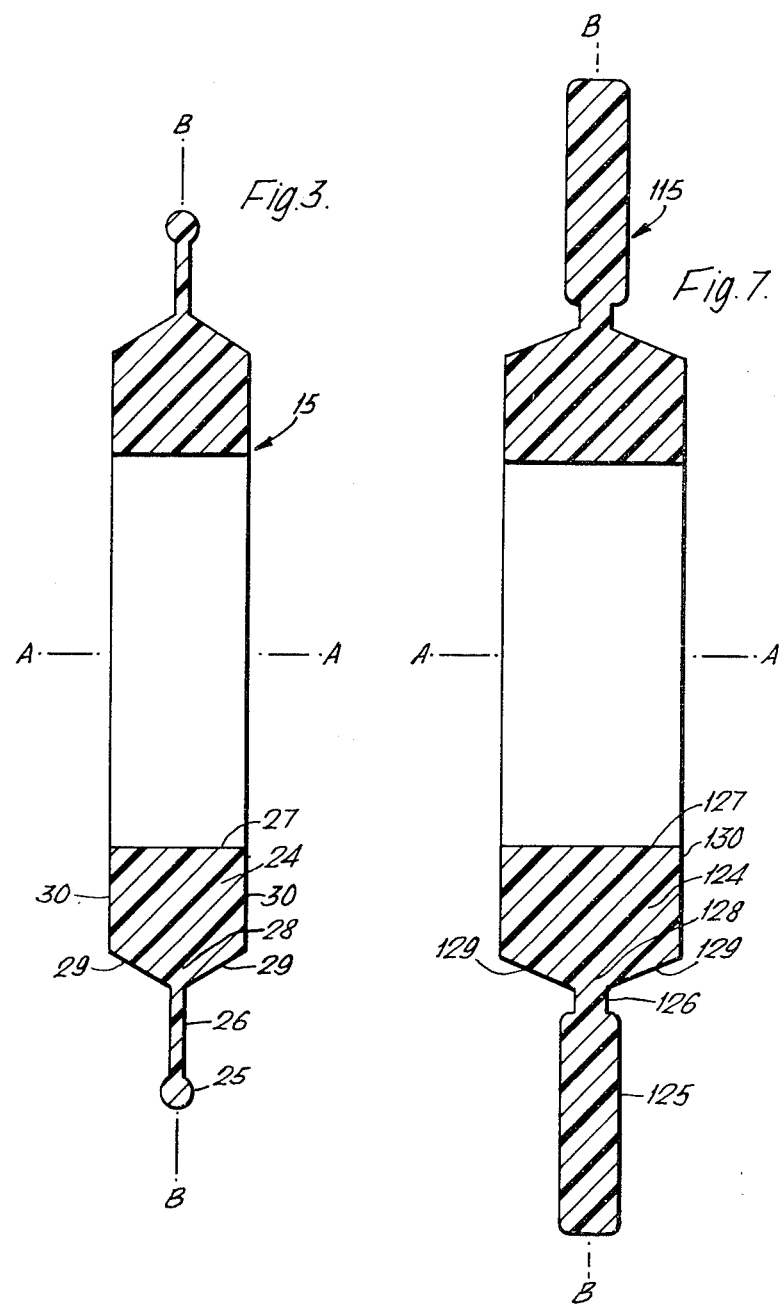

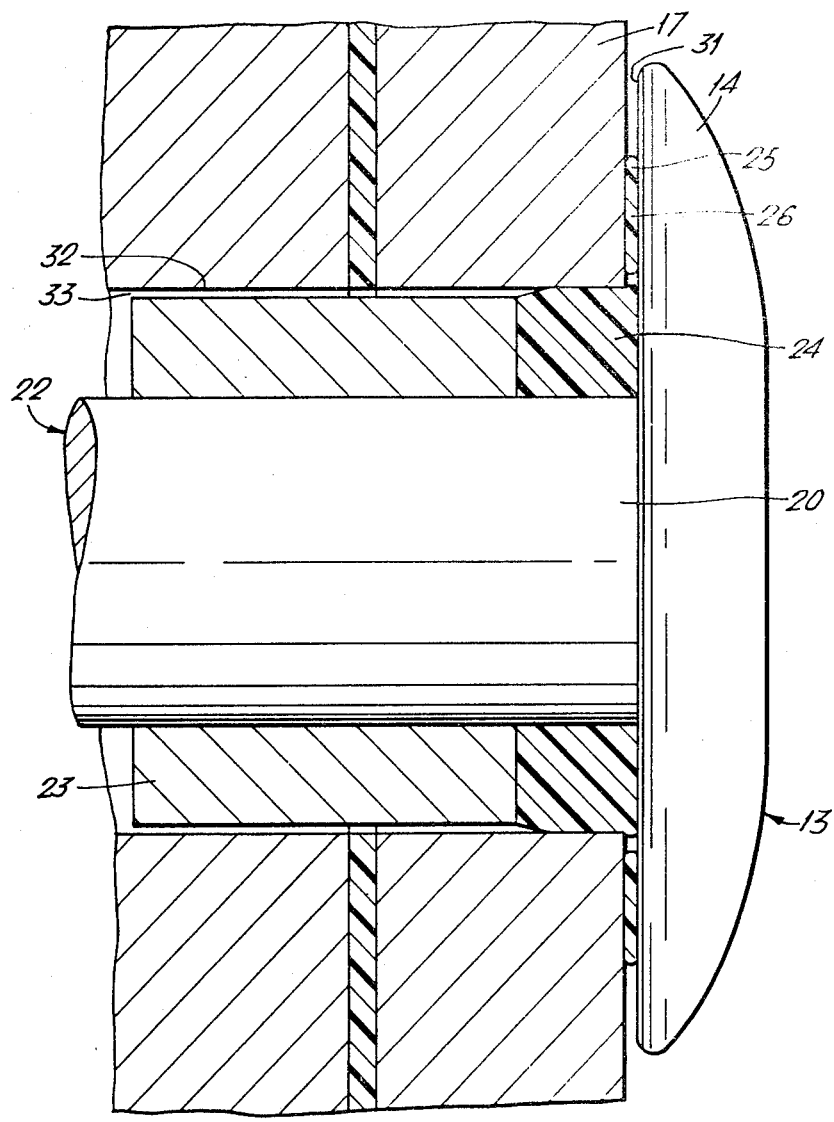

SEAL FOR HEADED PIN FASTENER MEMBER

This invention relates to a seal for sealing between the head end of a headed pin fastener member and an apertured workpiece in which the pin is to be installed. Such headed pin fastener members are of the type in which in use the pin is tensioned to pull the head against the workpiece. For example, the pin may be tensioned by a collar which is swaged into grooves in the pin while the latter is under tension, such a fastening device being commonly known as a lockbolt. In a further example, the pin may be tensioned by a headed sleeve carrying a resilient insert into which barbs on the pin engage. This latter fastener is sometimes referred to as a 'container bolt' since it is used for securing plywood panels to metal frames in the construction of freight containers. Alternatively the headed pin could be a threaded bolt which is tensioned by screwing on a threaded nut.

Whatever the particular form of headed pin fastener member one problem which arises in practice is that the user of the fastener member drills the hole into which the member is to be installed, rapidly and carelessly, so that the hole may be oversized or miss-shapen. However, the user also requires that when the fastener member is installed there is a seal between the head end of the pin and the workpiece, to prevent the entry of, for example, dirt or rainwater into the joint. Various designs of seal in such circumstances have been used, but have not proved satisfactory in practice.

In addition, in the case of the example fasteners mentioned above in which a collar or sleeve is placed over the tail end of the pin after insertion into the apertured workpiece, there is the problem that placing the collar or sleeve over the pin before final tensioning of the pin, and the subsequent application of the appropriate pulling tool over the sleeve and pintail, tend to push the pin back out of the aperture in which it has been inserted.

Furthermore, it is economically helpful in manufacture of the pin if the orientation of the seal with respect to the pin is not critical, i.e. if the seal can be assembled onto the pin either way round. This capability enables the use of either unskilled labour (for manual assembly) or a simpler assembly machine, and also removes the possibility of assembly the wrong way round thereby reducing the reject rate of assembled pins.

Accordingly the present invention provides:

a resilient seal for sealing between the head end of a headed pin fastener member and an apertured workpiece in which the pin is to be installed, which seal comprises:

an outer annular part for sealing between the pin head and the workpiece around the aperture;

and an inner annular part for fitting around the pin adjacent to the head;

said inner annular part projecting beyond the thickness of the outer annular part in a direction perpendicular thereto to provide wedging engagement between the pin and the aperture wall when the pin is inserted into the aperture so as to initially retain the pin in the aperture;

said inner annular part also projecting on both sides of the outer annular part so that the seal is substantially symmetrical whereby the seal can be assembled on the pin either way round;

the seal further comprising a weakened portion connecting said outer annular part to said inner annular part, which weakened portion, when the pin head is drawn towards the workpiece, enables the outer annular part to remain around the aperture as aforesaid whilst the inner annular part enters complete within the aperture.

According to a further feature of the invention, to assist in wedging of the inner annular part into an aperture which is of uniform diameter and not flared, the inner annular part is tapered on both sides.

In one embodiment of the invention, the outer annular part has a radial extent similar to its axial thickness, and in particular may be of circular cross-section. Such a seal may be of polypropylene material.

In another embodiment of the invention, the outer annular part has a radial extent about four or five times as great as its axial thickness. Such a seal may be of polyester elastomer material.

The invention includes the combination of a headed pin fastener member and a seal therefore as aforesaid.

Two specific embodiments of the invention, in the form of a headed pin fastener member incorporating a seal, and a modification of the seal, will now be described by way of example and with reference to the accompanying drawings, in which:

FIG. 1 shows a container bolt assembled with a seal adjacent the head of the pin;

FIG. 2 shows the container bolt after installation;

FIG. 3 is an axial section through the seal;

FIGS. 4, 5 and 6 show the head end of the pin and its seal at successive stages during the installation of the pin, and FIG. 7 is an axial section through a modified seal.

Figure 4:
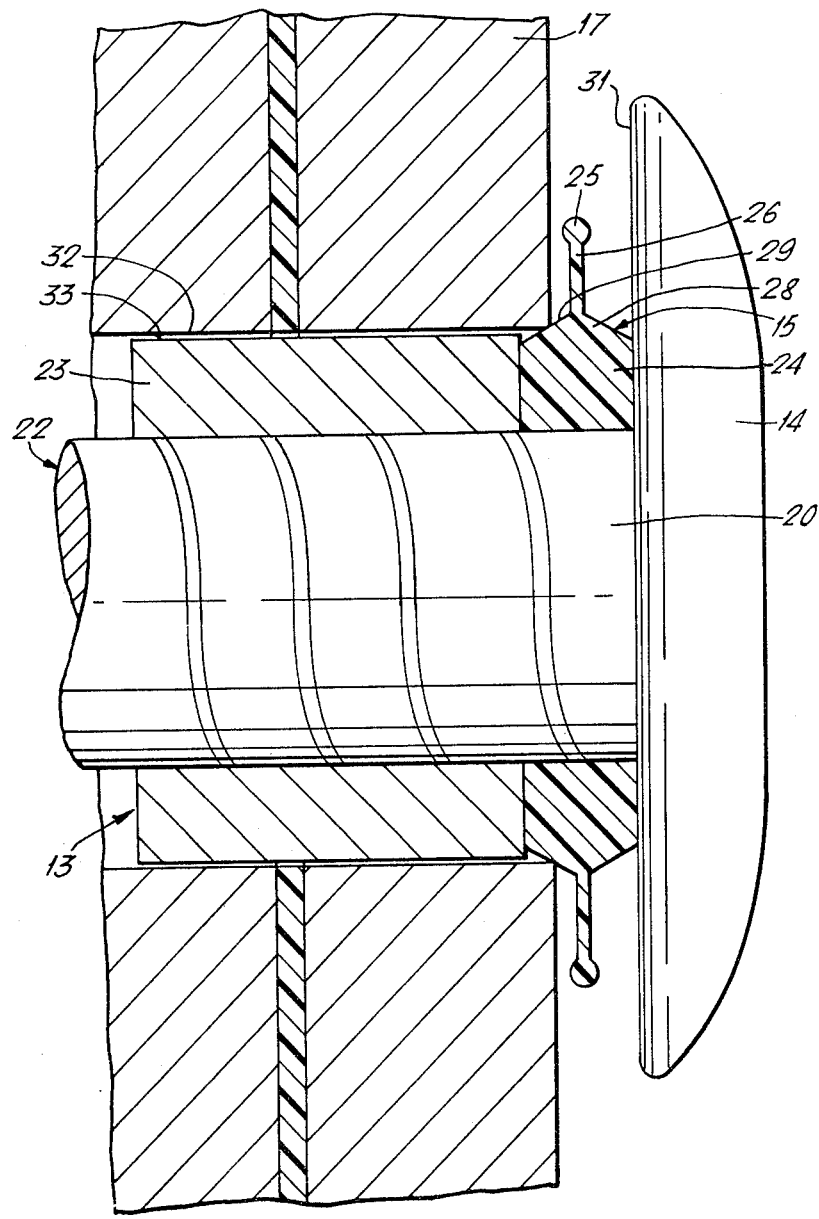

The container bolt of these examples comprises a steel pin 11 and a sleeve 12. The pin comprises a shank 13 and an enlarged head 14. Adjacent the head 14 the shank carries a seal 15 which will be described in detail later. FIG. 2 shows the fastener installed to secure a plywood panel 16 to a metal frame 17. An aperture 18 is drilled through the panel and frame, of such a diameter that it will accept the pin. The pin is inserted into the aperture from the side of the frame 17 until the seal 15 abuts the frame, and is then hammered in. The sleeve 12 is placed over the projecting tail end of the pin and by use of a suitable tool, not shown, the sleeve is pushed against the panel 16 and the pin is tensioned, pulling the seal 15 into the aperature in the frame. Annular barbs 19 on the pin engage in a nylon insert 21 in the sleeve to lock the pin to the sleeve, and the projecting end portion of the tail is broken off.

FIGS. 3 to 6 show in more detail the construction of the head end part of the pin and of the seal, and the way in which the seal is deformed when the pin is installed.

The shank 13 of the pin comprises an elongated stem 22 formed integrally with the enlarged head 14, and, adjacent the head 14, but separated therefrom by a space which receives the seal 15, a cylindrical sleeve 23. The sleeve 23 is secured to the stem by being an interference fit on a knurled portion 20 of the stem adjacent the head. The separate sleeve 23 is used to enable the seal 15 to be inserted into the space between the sleeve 23 and the pin head 14, by fitting first the seal 15 and then the sleeve 23 over the tail end of the stem 22 and then pushing the sleeve towards the head 14 so that the seal is sandwiched between the sleeve 23 and the head.

The seal 15 of this example is a unitary moulding of polypropylene which is deformable and resilient and is generally annular in form—that is to say, it has circular symmetry about an axis A—A (FIG. 3). It comprises an inner annular part 24, an outer annular part 25, and an intermediate annular part 26 connecting the inner and outer parts. The inner annular part 24 is for fitting closely around the pin stem 22 between the sleeve 23 and the head 14 and has a cylindrical radially inner face 27 of such a radius as to be an interference fit on the knurled portion 20 of the stem. The inner part projects on both sides beyond the thickness of the outer part 25, and has flat end faces 30. It is approximately square in cross-section, but its radially outermost portion 28 has two frusto-conical faces, 29, 29 which taper from the mid-plane B—B of the seal towards the end faces 30, 30.

At the apex where the tapers meet, the portion 28 joins integrally to the inner radius of the intermediate part 26 which is in the form of a thin annular web, of radial extent approximately equal to that of the inner part 24. At its outer circumference the intermediate part 26 joins integrally to the outer part 25, which is an annular bead of circular cross-section and of diameter about two or three times the thickness of the web 26. It will be seen that the seal 15, as well as having circular symmetry about the axis A—A, has bilateral symmetry about the central or median plane B—B perpendicular to the axis A—A. This allows the seal to be assembled either way round on the pin 22 and still produce the same final arrangement.

FIG. 4 shows the seal 15 assembled on the pin 22. As previously mentioned, the inner part 24 is an interference fit on the part 20 of the pin 22. The part 24 is sandwiched with one face 30 in contact with one end of the sleeve 23 and the other face 30 in contact with the underside or reverse face 31 of the pin head 14. The dimensions of the seal 15 are so chosen in relation to the dimensions of the pin that the external diameter of the sleeve 23 is intermediate to the inner and outer diameters of the frusto-conical face 29, in other words, the external diameter of the sleeve comes part of the way up the taper of the portion 28. Also, the outer part 26 is positioned approximately half way between the outer periphery of the sleeve 23 and the outer periphery of the head 14, that is, radially inside the head but outside the diameter of the largest oversize or miss-shapen hole through the panel 17 which might reasonably be expected to be made by a drill intended to bore a hole of nominal diameter to clear the maximum diameter of the stem over the sleeve 23.

Figure 5:
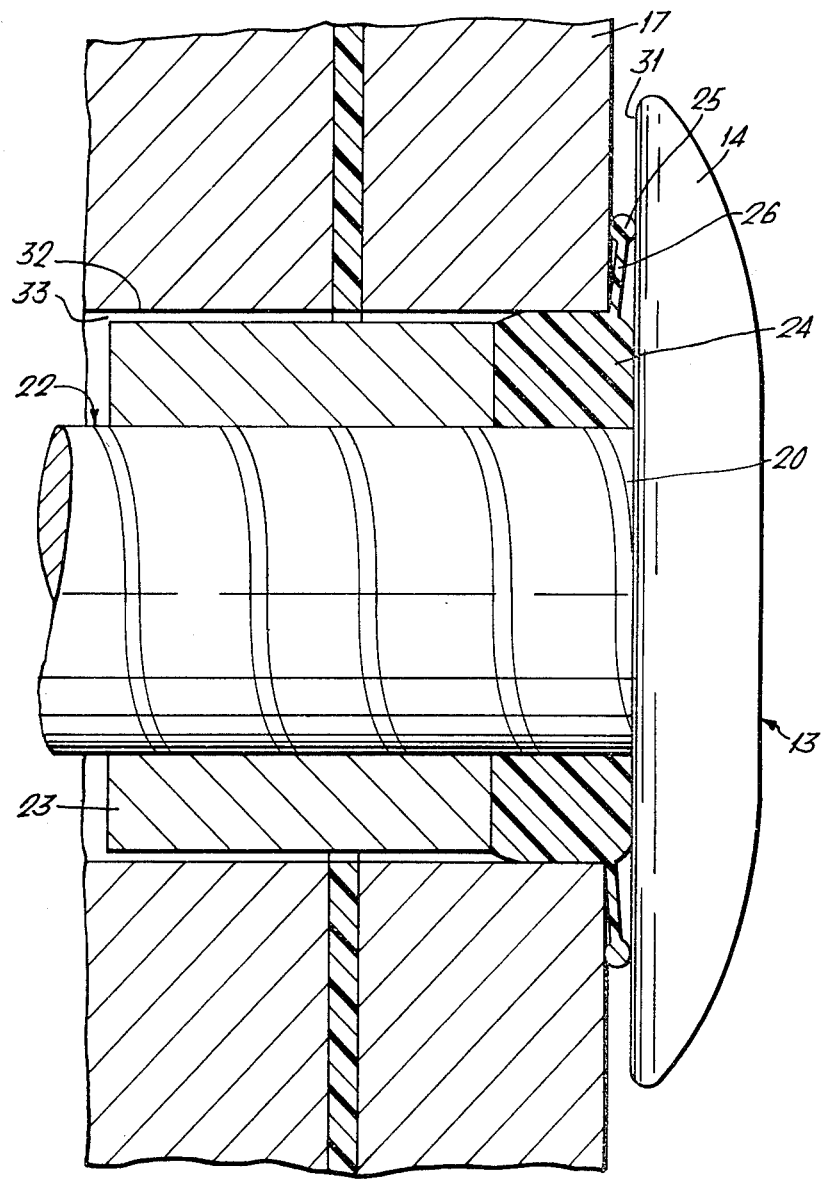

FIGS. 4, 5 and 6 illustrate the action of the seal 15 when the pin is installed in a hole 32 which is sufficiently oversize to leave an annular gap 33 between the wall of the hole and the exterior of the sleeve 23.

As previously mentioned, the pin is inserted into the hole 32 until the seal 15 abuts the frame 17, more specifically, until the end of the hole wall abuts the nearer frusto-conical face 29 of the inner annular part 24. This is the position shown in FIG. 4.

The pin is now forced further into the hole by the application of hammer blows to the head 14. This causes the seal 15 to deform as it enters the hole 32. The tapered face 29 against the workpiece 17 is squashed inwards and back towards the pin head 14. If the gap 33 is large enough, the radially innermost part of the annular connecting web 26 may enter the gap. However, in some cases, as for example illustrated in FIG. 5, the web is sheared off around its inner periphery from the inner part 24 of the seal, and remains outside the face of the frame 17. The face 31 of the head 14 approaches the face of the frame until the bead 25 prevents further movement. The deformed inner part 24 of the seal wedges the pin into the hole 32 sufficiently securely to keep the pin in position when the sleeve 12 and then the pulling tool (not shown) are applied to the tail end of the pin to tension the pin and lock it into the sleeve. This tension applies to the head 26 a much greater force than the hammer blows on the pin head, and thus compresses and distorts the bead 25 until it is substantially the same thickness as the web 26. This is the position shown in FIG. 6.

Although the deformed bead 25 exerts a substantial force to try to move the pin head 14 away from the frame 17, the engagement of the barbs 19 on the stem within the insert 21 in the locking sleeve 12 overcomes this force and prevents any reverse movement of the pin. Thus a tight and effective seal is achieved and maintained between the head 14 of the pin and the frame 17.

There will now be described by way of further example a modified form of the seal just described, for use with the same headed pin fastener member just described. This modified seal will be described with reference to FIG. 7 of the drawings, which is an axial section through the seal, and corresponds to FIG. 3 of the drawings. Other parts of the fastener described in the previous example will also be referred to, and reference should accordingly be made to the appropriate Figures of the drawings.

The modified seal of this example is similar to that described in the foregoing example and particularly illustrated in FIG. 3. The modification consists in that the cross-section of the outer annular part is now rectangular with radiused corners, instead of circular.

The seal 115 is a unitary moulding of a polyester elastomer commercially available under the designation HYTREL 5556. The seal is deformable and resilient and is generally annular in form—that is to say, it has circular symmetry about an axis A—A and has a central aperture. It comprises an inner annular part 124, an outer annular part 125, and an intermediate annular part 126 connecting the inner and outer parts. The inner annular part 124 is for fitting closely around the pin stem 22 between the sleeve 23 and the head 14 and has a cylindrical radially inner face 127 of such a radius as to be an interference fit on the knurled portion 20 of the stem. The inner part projects on both sides beyond the thickness of the outer part 125, and it has flat end faces 130. It is approximately square in cross-section, but its radially outermost portion 128 has two frusto-conical faces, 129, 129 which taper towards the free ends 130, 130.

At the apex where the tapers meet, the portion 128 joins integrally the inner radius of the intermediate part 126 which is in the form of a thick annular web, of radial extent approximately equal to its thickness. At its outer circumference the intermediate part 126 joins integrally to the outer part 125, which is an annular bead of a cross-section which is generally rectangular. It has a radial extent which is about four or five times its thickness, which thickness is about twice the thickness of the web 126. The inner and outer corners of the rectangular cross-section are radiused, as illustrated in FIG. 7. It will be seen that the seal 115, as well as having circular symmetry about the axis A—A, has bilateral symmetry about the central or median plane B—B perpendicular to the axis A—A. This allows the seal to be assembled either way round on the pin 22 and still produce the same final arrangement.

Comparing the first example seal illustrated in FIG. 3 and the modified seal illustrated in FIG. 7, it will be seen that the overall diameter of the modified seal is somewhat larger. However the major difference in function of the modified seal is that the increased amount of material in the enlarged outer part 126 provides a better and more efficient seal when the fastener is fully installed. The polyester elastomer material of the modified seal of FIG. 7 is more resilient (i.e. softer) than the polypropylene material of the seal of FIG. 3. The relatively large size of the seal of FIG. 7 is such that, in use, it is not deformed beyond its elastic limit.

Apart from the modified shape and different material of the seal, the construction and function of the fastener incorporating it remains unchanged. Acordingly the relevant parts of FIGS. 1 to 6 and the description corresponding thereto are to be understood as applying to the fastener incorporating the modified seal herein described with reference to FIG. 7.

The invention is not limited to the details of the foregoing examples.

For instance, in use of the fasteners, the web 26 or 126 may be severed incompletely, or not at all, depending on the precise conditions in the particular installed fastener. The seal may have other configurations, and be made from other materials, than those described in the foregoing examples. If the pin is to be inserted in a hole which has a flare or countersink, then the innermost part 24 or 124 of the seal need not have tapering faces 29 or 129. However since it is cheaper and easier to drill a plain (parallel bore) hole without a flare, it is preferable that the seal is tapered as described in the foregoing examples.

What we claim is:

1. A resilient seal for sealing between the head end of a headed pin fastener member and an apertured workpiece in which the pin is to be installed, which seal comprises:
    an outer annular part for sealing between the pin head and the workpiece around the aperture;
    and an inner annular part for fitting around the pin adjacent to the head;
    said inner annular part projecting beyond the thickness of the outer annular part in a direction perpendicular thereto and being tapered on the face thereof which is towards the outer annular part to provide wedging engagement between the pin and the aperture wall when the pin is inserted into the aperture so as to initially retain the pin in the aperture;
    said inner annular part also projecting on both sides of the outer annular part and being tapered on said face at both sides of said outer annular part so that the seal is substantially symmetrical whereby the seal can be assembled on the pin either way round;
    the seal further comprising a frangible weakened portion connecting said outer annular part to said inner annular part, said weakened portion being imperforate and continuous and having a lesser thickness than the said outer annular part, whereby said frangible weakened portion, when the pin head is drawn towards the workpiece, breaks and thereby enables the outer annular part to remain around the aperture as aforesaid whilst the inner annular part enters completely within the aperture.

2. A headed pin fastener member for installation in an aperture in a workpiece, which pin carries, adjacent the head, a resilient seal which seal comprises:
    an outer annular part for sealing between the pin head and the workpiece around the aperture;
    and an inner annular part for fitting around the pin adjacent to the head;
    said inner annular part projecting beyond the thickness of the outer annular part in a direction perpendicular thereto and being tapered on the face thereof which is towards the outer annular part to provide wedging engagement between the pin and the aperture wall when the pin is inserted into the aperture so as to initially retain the pin in the aperture;
    said inner annular part also projecting on both sides of the outer annular part and being tapered on said face at both sides of said outer annular part so that the seal is substantially symmetrical whereby the seal can be assembled on the pin either way round;
    the seal further comprising a frangible weakened portion connecting said outer annular part to said inner annular part, said weakened portion being imperforate and continuous and having a lesser thickness than the said outer annular part, whereby said frangible weakened portion, when the pin head is drawn towards the workpiece, breaks and thereby enables the outer annular part to remain around the aperture as aforesaid whilst the inner annular part enters completely within the aperture.

* * * * *